United States Patent [19]

Tobita

[11] Patent Number: 4,589,017

[45] Date of Patent: May 13, 1986

[54] PAY TELEVISION RECEIVING SYSTEM

[76] Inventor: Katsumi Tobita, 39-2, Aza-Yomogida, Dohzuki, Soma-shi, Fukushima-ken, Japan

[21] Appl. No.: 363,473

[22] Filed: Mar. 30, 1982

[30] Foreign Application Priority Data

Apr. 2, 1981 [JP] Japan .................................. 56-49882

[51] Int. Cl.⁴ ........................................... H04N 7/167
[52] U.S. Cl. ..................................................... 358/120
[58] Field of Search ............... 358/117, 120, 122, 123, 358/124

[56] References Cited

U.S. PATENT DOCUMENTS

| 3,184,537 | 5/1965 | Court et al. | 358/120 |
| 3,530,232 | 9/1970 | Reiter et al. | 358/120 |
| 3,729,576 | 4/1973 | Court | 358/124 |
| 3,777,053 | 12/1973 | Wittig et al. | 358/117 |
| 4,022,972 | 5/1977 | Pires . | |
| 4,024,574 | 5/1977 | Nieson . | |
| 4,025,948 | 5/1977 | Loshin . | |
| 4,095,258 | 6/1978 | Sperber | 358/120 |
| 4,145,717 | 3/1979 | Guif et al. | 358/120 |
| 4,323,922 | 4/1982 | Toonder et al. | 358/120 |

FOREIGN PATENT DOCUMENTS 0119588 9/1981 Japan .................................. 358/122

Primary Examiner—S. C. Buczinski
Attorney, Agent, or Firm—Guy W. Shoup

[57] ABSTRACT

In a system for receiving a scrambled pay television signal wherein a radio frequency video signal with a horizontal synchronizing signal erased therefrom by elevating portions of the video signal containing picture information and a radio frequency aural signal with a horizontal synchronizing trigger pulse and a data processing trigger pulse superposed thereon are received, the data processing trigger pulses are detected from the radio frequency aural signal and are used for comparison with a code assigned to a pay television receiving subscriber, and the horizontal synchronizing signal is restored on the basis of the horizontal synchronizing trigger pulses when the pay television broadcast is receivable; the improvement comprising a waveform shaping circuit which shapes the horizontal synchronizing trigger pulse and the data processing trigger pulse into desired pulse forms, a clock isolating circuit and a data isolating circuit to which the shaped pulses are applied and which deliver horizontal synchronizing pulses and data pulses respectively, a data comparator which makes the comparison by the use of the data pulses applied thereto, a vertical synchronizing signal-regenerating circuit which delivers a vertical synchronizing pulse, a gate circuit which is controlled by an output of the data comparator and which, when enabled, delivers a signal with the vertical synchronizing pulse added to the horizontal synchronizing pulse, and a switching attenuator which is controlled by the output signal of the gate circuit.

8 Claims, 4 Drawing Figures

4,589,017

PAY TELEVISION RECEIVING SYSTEM

BACKGROUND OF THE INVENTION

The present invention relates to a pay television receiving system for use in cable systems or wireless broadcasting.

Pay television is operated with subscription fees paid by subscribers. In order to permit the reception of only a contracted channel, the channel selector of a receiving set has been additionally provided with a device which selectively renders the contracted channel receivable. However, there have been cases where an artifice has been applied, often in a simple manner, to enable viewing of channels that have not properly been contracted for.

In recent years, accordingly, pay television signals have been scrambled. More specifically, a video signal is put into a particular form and is scrambled by superposing a special data code signal thereon. The scrambled signal is transmitted. On the receiving side, the data code signal is decoded by a data processing circuit. A descrambler circuit restores the normal video signal after the data code signal has been decoded.

SUMMARY OF THE INVENTION

An object of the present invention is to provide a pay television receiving system for reliably reproducing a television broadcast which has been scrambled so as not to be unfairly received.

According to one aspect of performance of the present invention, a pay television receiving system comprises a frequency converter which frequency-converts a pay television signal into an intermediate frequency signal and delivers the latter; the pay television signal is comprised of a radio frequency video signal with a horizontal synchronizing pulse rendered inoperable or defeated by an elevated video picture portion thereof and a radio frequency aural signal with a horizontal synchronizing trigger pulse and a data processing trigger pulse superposed thereon; a switching attenuator to which an output signal of said frequency converter is applied and which can exert an attenuation corresponding to a predetermined level for a desired time on the basis of a control signal; a data receiver which extracts part of an aural intermediate frequency signal from said intermediate frequency signal delivered by said frequency converter and which detects said horizontal synchronizing trigger pulse and said data processing trigger pulse; and a data processing circuit which compares a digital code formed of the data processing trigger pulses provided from said data receiver and a code specified for a pay television reception subscriber and stored in a ROM device, to judge whether or not a pay television channel is contracted, and which supplies said switching attenuator in case of the contracted pay television channel with the control signal to attenuate a picture signal between the horizontal synchronizing pulses by the predetermined level and in case of the uncontracted pay television channel with the control signal to pass said intermediate frequency signal with no loss.

Further objects and features of the present invention will become apparent from the following description taken in conjunction with the drawings.

DETAILED DESCRIPTION OF THE INVENTION

Figure 1:
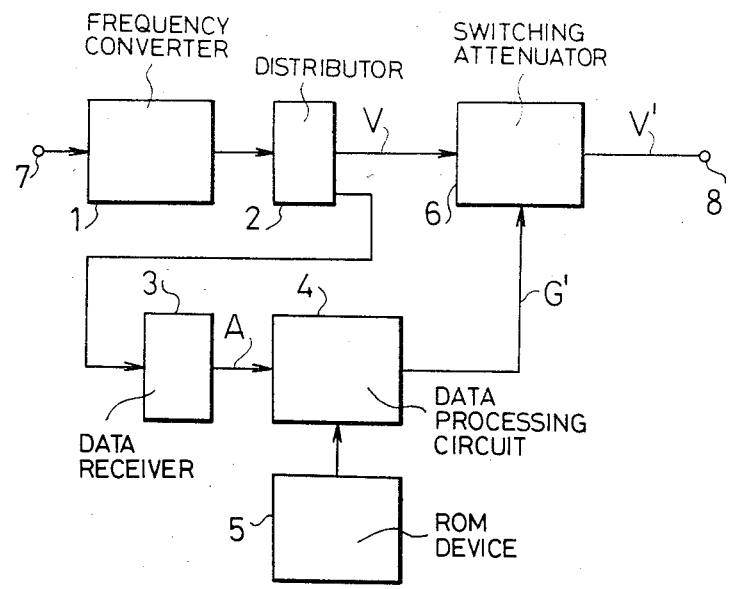
FIG. 1 is a block diagram which shows a pay television receiving system according to the present invention.

The present invention has realized a system for receiving a scrambled television broadcast. FIG. 1 shows the receiving system according to the present invention.

Referring to FIG. 1, ordinary television broadcast signals which have not been scrambled and a pay television signal which has been scrambled at the transmitter end arrive at an input terminal 7. A video signal in the case of the scrambled pay television signal is such that the level of the section between horizontal synchronizing signals where a picture signal exists is raised approximately 6 dB to defeat the horizontal synchronizing signals. Under this state, the video signal cannot be synchronized, and the pay television signal cannot be received. On the other hand, the corresponding aural signal is such that when ordinary speech is FM-modulated, a composite data signal which consists of a horizontal synchronizing trigger pulse and a data processing trigger pulse is AM-modulated and then superposed thereon. On the receiving side, the composite data signal is obtained through AM-demodulation. The aforecited horizontal synchronizing trigger pulse exists at a position synchronous with the horizontal synchronizing pulse of the video signal, while the aforecited data processing trigger pulse is inserted between the adjacent ones of several horizontal synchronizing trigger pulses as above mentioned, appearing after the end of a vertical retrace time.

Now, the receiving system will be described in detail. Numeral 1 designates a frequency converter, to which signals for a plurality of channels sent from a cable or an antenna are applied via the input terminal 7 as radio frequency signals. In the radio frequency signals, the ordinary television signals and the pay television signals coexist in a mixed fashion. As stated previously, the pay television signal has been scrambled and modulated at the transmitter end.

The frequency converter 1 has a channel selector, through which a desired channel is delivered in the form of an intermediate frequency signal (hereinafter, termed "IF signal"). The IF signal is applied to a distributor 2. One output of the distributor 2 sends the IF signal to a switching attenuator 6, while the other output takes out part of an aural IF signal and sends it to a data receiver 3. On the basis of the aural IF signal, the data receiver 3 demodulates the composite data signal described before.

When the composite data signal provided from the data receiver 3 is applied to a data processing circuit 4, it is separated into the horizontal synchronizing trigger pulse and the data processing trigger pulse by the data processing circuit 4. The data processing trigger pulse is detected as a digital code which has a predetermined number of bits. The digital code is compared with the code of the particular subscriber stored in a ROM device 5, to judge whether or not the pay television channel has been contracted.

On the other hand, the data processing circuit 4 forms both the normal horizontal synchronizing pulse and a pulse for the vertical retrace time. When, as the result of the decoding based on the data processing trigger pulse, the pay television signal has been judged as being contracted, the horizontal synchronizing pulse and the pulse for the vertical retrace time as formed by the data processing circuit 4 are sent to the switching attenuator 6. In contrast, in case of an uncontracted pay television signal, no synchronizing pulse is sent. That is, a high level is kept delivered from the data processing circuit 4.

Figure 3:
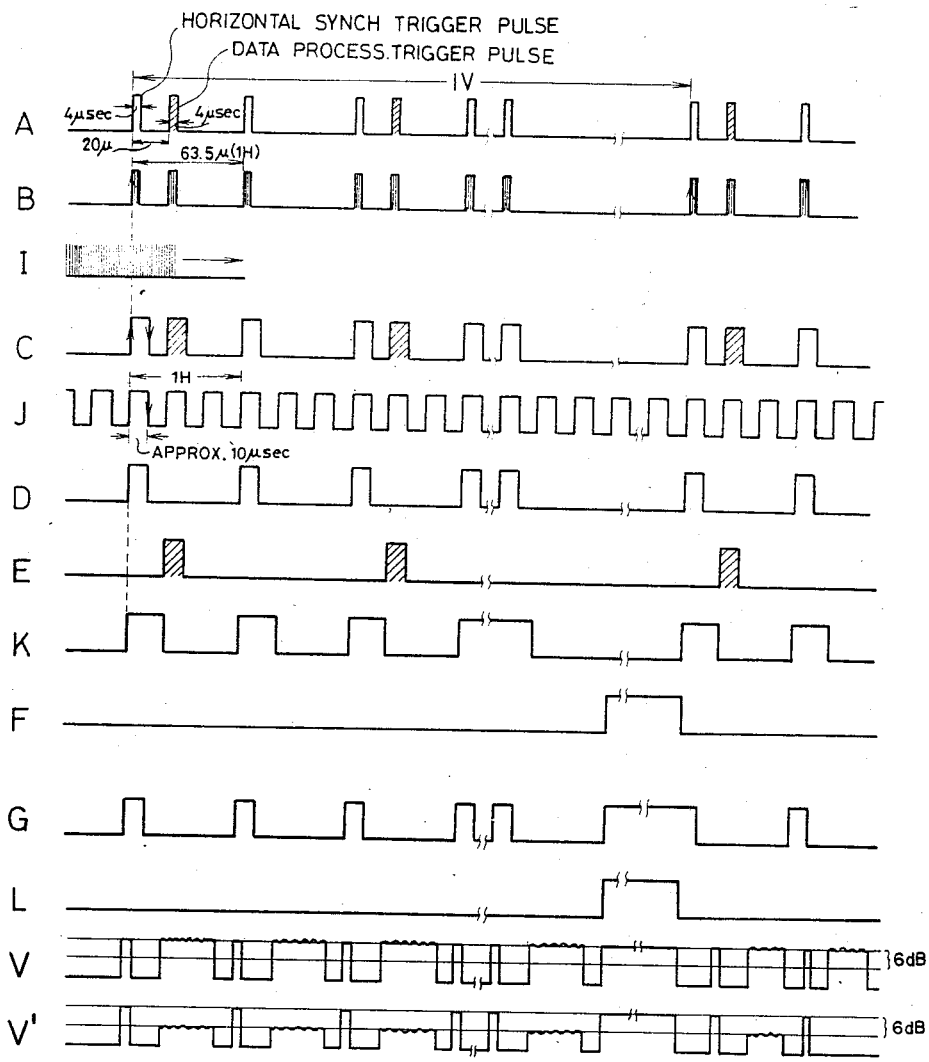
FIG. 3 is a time chart which shows signals in various parts of the data processing circuit.

When supplied with the high level from the data processing circuit 4, the switching attenuator 6 allows the IF signal from the distributor 2 to pass therethrough with substantially null loss and provides the television signal at an output termianl 8. When the input of the switching attenuator 6 from the data processing circuit 4 is at a low level, this switching attenuator functions to attenuate the IF signal for example, shown as V in FIG. 3, approximately 6 dB. Accordingly, when the horizontal synchronizing pulse formed by the data processing circuit 4 has entered the switching attenuator 6, a high level pulse is supplied in the part of the horizontal synchronizing pulse. A section corresponding to the high level pulse is not attenuated, and the other section is attenuated approximately 6 dB. Therefore, the output of the switching attenuator 6 shown as V' in FIG. 3, is reproduced (descrambled) as the normal video IF signal, which is fed to the succeeding stage. That is, the horizontal synchronizing pulse is restored by the high level pulse during the time of the horizontal synchronizing pulse, while the whole vertical retrace time is restored by the pulse for the vertical retrace time. The succeeding stage referred to above is a conventional picture receiving circuit of television.

Of course, when the output of the data processing circuit 4 is kept at the high level, the switching attenuator 6 does not attenuate the IF signal at all. Therefore, the uncontracted pay television signal is not descrambled and is supplied to the succeeding stage in the scrambled state, so that the signal cannot be received in its original state.

When the received channel is one of the ordinary television signals having a normal signal, the aural IF signal thereof includes no composite data signal and cannot be decoded with the code of the ROM device 5. Therefore, the data processing circuit 4 performs the same function as in the reception of the uncontracted pay television broadcast and provides the high level continually. Accordingly, the switching attenuator 6 passes the IF signal without attenuating it, and the normal television signal realizes a quite normal picture reception irrespective of the descrambler circuit.

Figure 2:
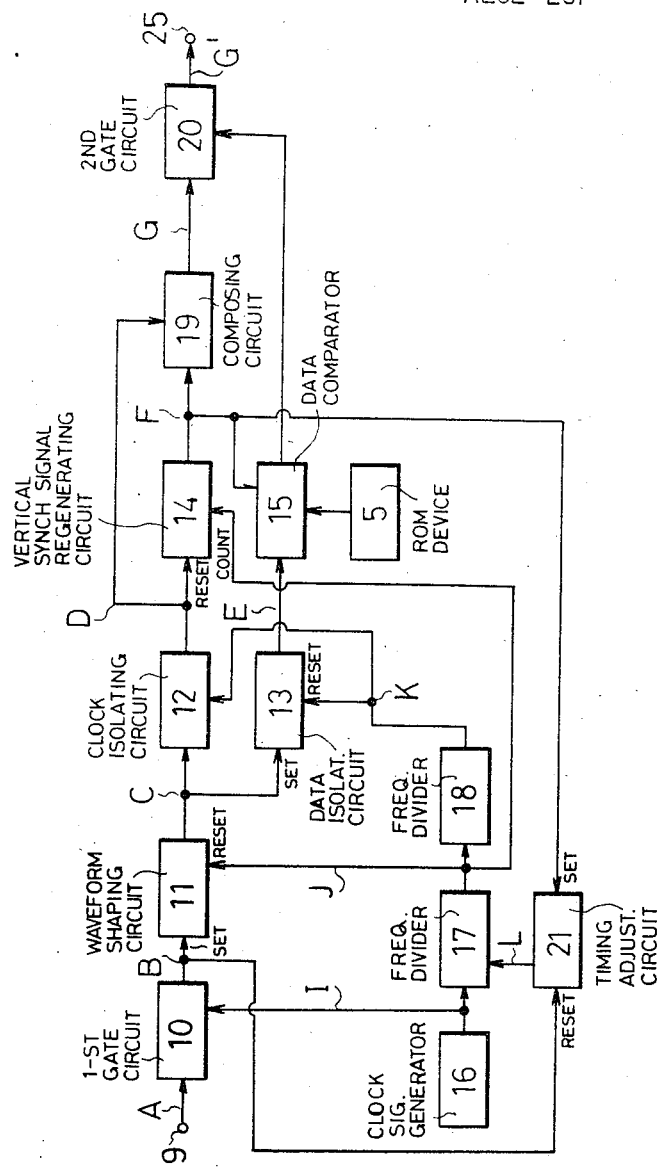
FIG. 2 is a block diagram which shows a data processing circuit included in the pay television receiving system.

Now, the data processing circuit 4 which constitutes the subject matter of the present invention will be described in detail with reference to FIG. 2 illustrative of a practical circuit arrangement, and FIG. 3 illustrative of signals in various parts of the data processing circuit. The composite data signal shown in A of FIG. 3 is derived in the data receiver 3, and is applied from a terminal 9 to a first gate circuit 10. The first gate circuit 10 is also supplied with an oscillation signal I from a clock signal generator 16. Thus, it provides a composite data signal as shown in B of FIG. 3. The first gate circuit 10 is especially disposed in order to synchronize the rise of the composite data signal and the clock signal applied to various circuits described below. The oscillation frequency of the clock signal generator 16 must be a frequency sufficiently higher than the frequency of the horizontal synchronizing signal. For example, it must be a frequency of at least 1.0 MHz in order that a time delay allowed for the output response of the first gate circuit 10 may be suppressed to 1 $\mu$sec.

The output of the first gate circuit 10 is applied to a waveform shaping circuit 11, in which it is given a pulse width required for the composite data signal. The waveform shaping circuit 11 is supplied with the composite data signal and also a frequency division signal J shown in FIG. 3 and obtained by dividing the frequency of the oscillation signal I with a frequency divider 17. This waveform shaping circuit is constructed of a flip-flop which is set by the rise of the composite data signal and which is reset by the fall of the frequency division signal J. It provides an output signal as shown in C of FIG. 3.

The waveshaped composite data signal is applied to a clock isolating circuit 12 and a data isolating circuit 13. The clock isolating circuit 12 is also supplied with a frequency division signal K obtained by further dividing the frequency of the frequency division signal J with a frequency divider 18. Thus, the composite data signal and the frequency division signal K are applied to an AND gate constructing the clock isolating circuit 12, and only the horizontal synchronizing trigger pulse D as shown in D of FIG. 3 is derived therefrom. In addition, the frequency division signal K is also applied to the data isolating circuit 13. When a flip-flop constructing the data isolating circuit 13 is set by the fall of the frequency division signal K and is reset by the fall of the composite data signal, only the data processing trigger pulse E is derived therefrom as shown in E of FIG. 3.

The horizontal synchronizing trigger pulses D derived from the clock isolating circuit 12 are applied to a vertical synchronizing signal-regenerating circuit 14. The vertical synchronizing signal-regenerating circuit 14 is constructed of a counter and a flip-flop, and receives the frequency division signal J at the clock terminal of the counter. When the counter has counted three pulses of the frequency division signal J during a prescribed period 1H, the flip-flop is set, horizontal synchronizing whereupon the flip-flop is reset by the horizontal synchronizing trigger pulse D. Thus, as shown in F of FIG. 3, a vertical synchronizing signal F is provided in the vertical retrace time during which no horizontal synchronizing trigger pulse appears.

The data processing trigger pulses E derived from the data isolating circuit 13 are applied to a data comparator 15, which is also supplied with the subscriber code from the ROM device 5. The data comparator 15 compares the data code of the data processing trigger pulses with the subscriber code from the ROM device, to judge whether or not the pay television channel has been contracted. It holds the comparison result by means of its latch circuit, and resets the latch circuit with the vertical synchronizing signal F fed from the vertical synchronizing signal-regenerating circuit 14. In this way, it makes the comparison every period V (field). It delivers a low level to a second gate circuit 20 in case of the contracted channel, and a high level in case of the uncontracted channel.

The horizontal synchronizing trigger pulses D from the clock isolating circuit 12 and the vertical synchronizing signal F from the vertical synchronizing signal-regenerating circuit 14 are applied to a composing circuit 19 constructed of an OR circuit, and are composed as shown in G of FIG. 3. That is, the horizontal synchronizing signal and the vertical synchronizing signal are added to obtain the synchronizing signal G in the ordinary television broadcast.

The synchronizing signal G from the composing circuit 19 and the decision result from the data comparator 15 are applied to the second gate circuit 20. This second gate circuit 20 delivers the synchronizing signal G left intact when the signal from the data comparator 15 is of the low level, and it continually delivers the high level when the signal is of the high level. Thus, it controls the switching attenuator 6.

A timing adjusting circuit 21 adjusts the timing of the frequency divider 17 and is constructed of, for example, a flip-flop. It is supplied with the vertical synchronizing signal F from the vertical synchronizing signal-regenerating circuit 14 and the composite data signal from the first gate circuit 10. It is set by the rise of the vertical synchronizing signal F and reset by the fall of the composite data signal, thereby to deliver a signal L as shown in L of FIG. 3. This signal is applied to the frequency divider 17.

Figure 4:
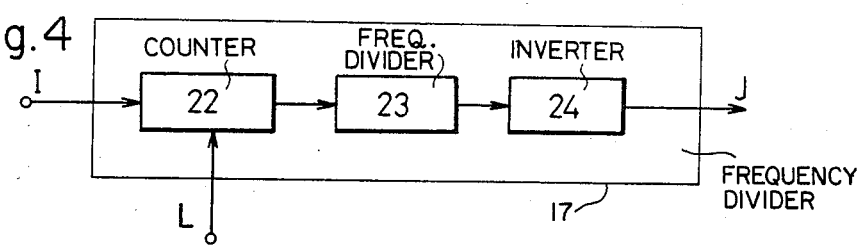
FIG. 4 is a block diagram which shows the details of a frequency divider included in the data processing circuit.

As shown in FIG. 4, the frequency divider 17 is constructed of a counter 22, a frequency divider unit 23 and an inverter 24. The counter 22 of the frequency divider 17 is supplied with the oscillation signal I from the clock signal generator 16, and also with the signal L. The fall of the signal L resets the counter 22, to adjust the starting time of the counting of the counter 22 to the fall of the vertical synchronizing signal. The counter 22 and the frequency divider unit 23 operate to divide the frequency of the oscillation signal I at a predetermined frequency division ratio. Eventually, the output of the frequency divider 17 becomes the frequency division signal J which has a pulse width substantially equal of the pulse width (approximately 10 μsec) of the horizontal synchronizing signal.

As set forth above, the present invention consists in a receiving system in which electronic circuitry is ingeniously arranged. Such arrangement requires knowledge on the system and a high degree of skill in electronic circuitry. Accordingly, it renders the improper viewing of a pay television broadcast very difficult and prevents unfair viewing thereof.

The receiving system according to the present invention does not form any obstacle to the function of receiving ordinary television signals. Further, since the data processing trigger pulse of a composite data signal is inserted between horizontal synchronizing pulses, the number of bits of a digital code may be increased at will as is necessary. This ensures sufficient encoding of pay television subscribers.

A data processing circuit in the receiving system according to the present invention operates with reference to the oscillation signal of a clock signal generator. Therefore, when the clock signal generator is caused to oscillate at a very high precision by employing a quartz oscillator, ceramic oscillator or the like, the pulse width and period of the oscillation signal do not fall into disorder, the operation of the data processing circuit becomes stable and a picture reproduction (descrambling) of high fidelity becomes possible. In addition, since a time constant circuit including a capacitor and a resistor is not employed, the secular changes of the data processing circuit are avoided, the use of an IC or LSI is facilitated and the circuit can be fabricated in a small size and at low cost. Further, since the clock signal is stable and a timing adjusting circuit is comprised, the whole circuitry operates on the basis of the exact timing of a vertical synchronizing signal. Therefore, the problem of synchronism that timings deviate does not occur, no adjustment is necessary and the job efficiency is enhanced. Moreover, when the IC or LSI is introduced, the circuit arrangement can be regarded as a black box and cannot be simply changed by a dishonest act. This prevents the unfair viewing of the pay television signal.

What is claimed is:

1. A pay television receiving system comprising:
    means including a frequency converter for converting a pay television signal into an intermediate frequency signal said pay television signal being comprised of a video signal with a horizontal synchronizing pulse defeated by elevated portions of the video signal containing picture information, and an aural signal with a horizontal synchronizing trigger pulse and a data processing trigger pulse superposed thereon;
    a switching attenuator adapted to receive the output signal of said frequency converter and having means for attenuating said intermediate frequency signal to a predetermined level for a desired time on the basis of a control signal;
    means including a data receiver for extracting part of an aural intermediate frequency signal from said intermediate frequency signal delivered by said frequency converter and detecting said horizontal synchronizing trigger pulse and said data processing trigger pulse; and
    means including a data processing circuit for forming synchronizing pulses by comparing a digital code formed of the data processing trigger pulses provided from said data receiver and a code specified for a pay television reception subscriber and stored in a ROM device, to judge whether or not a pay television channel is contracted, and supplying said switching attenuator in case of the contracted pay television channel with a control signal adapted to attenuate those elevated portions of said video signal cotaining picture information by the predetermined level to form synchronizing pulses between the attenuated portions of said video signal and in case of the uncontracted pay television channel with the control signal to pass said intermediate frequency signal with no loss.

2. A pay television receiving system as defined in claim 1, wherein said horizontal synchronizing trigger pulse and said data processing trigger pulse are modulated by a modulation method different from that of said aural signal.

3. A pay television receiving system comprising:
    means for receiving a video signal with a horizontal synchronizing signal defeated by elevated portions of the video signal containing picture information, and an aural signal with a horizontal synchronizing trigger pulse and a data processing trigger pulse superposed thereon;
    means for detecting said horizontal synchronizing trigger pulse and said data processing trigger pulse from said radio frequency aural signal;
    means including a waveform shaping circuit for receiving said horizontal synchronizing trigger pulse and said data processing trigger pulse detected from said radio frequency aural signal for shaping them into desired pulse forms;

means including a clock isolating circuit and a data isolating circuit for receiving the shaped pluses to form horizontal synchronizing pulses and data pulses being respectively delivered from said clock isolating circuit and said data isolating circuit;

means including a data comparator for receiving said data pulses to compare them with a code assigned to a pay television subscriber;

a gate circuit controlled by an output of said data comparator;

means including a vertical synchronizing signal-regenerating circuit for delivering a vertical synchronizing pulse;

said data circuit delivering when enabled, a signal with said vertical synchronizing pulse added to said horizontal synchronizing pulse; and means including a switching attenuator controlled by the output signal of said gate circuit and receiving said video signal to attenuate the elevated portions thereof containing picture information to restore operable synchronizing signals.

4. A pay television receiving system as defined in claim 3, wherein said waveform shaping circuit, said clock isolating circuit, said data isolating circuit and said vertical synchronizing signal-regenerating circuit are respectively supplied with clock signals obtained by frequency-dividing an oscillation output from a single clock signal generator.

5. A pay television receiving system as defined in claim 3, wherein said waveform shaping circuit and said vertical synchronizing signal-regenerating circuit are supplied with clock signals having an identical frequency.

6. A pay television receiving system as defined in claim 3, wherein said clock isolating circuit and said data isolating circuit are supplied with clock signals having an identical frequency.

7. A pay television receiving system as defined in claim 3, further comprising a timing adjusting circuit supplied with the vertical synchronizing signal and a composite data signal and adjusting a timing of a frequency divider.

8. A system for receiving on a selective basis television signals having the signal level of portions thereof containing picture information elevated to defeat horizontal synchronizing signals carried between said portions, and having a corresponding horizontal synchronizing signal and a data signal superposed on an aural portion of the television signals, comprising means including an attenuator for receiving said television signals and for attenuating the elevated portions thereof when activated, and means adapted to recieve the corresponding horizontal synchronizing signal and the data signal from said aural signal for comparing said data signal with a preselected reference code and, upon matching thereof, activating said attenuator to attenuate the elevated portions of said television signals so as to restore the operability of said horizontal synchronizing signals.

* * * * *